June 25, 1935.  A. J. SCHOLTES  2,006,327
HOSE CLAMP
Filed June 29, 1934
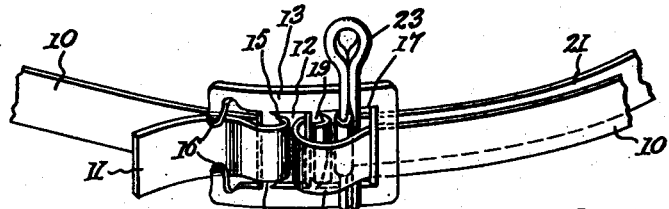
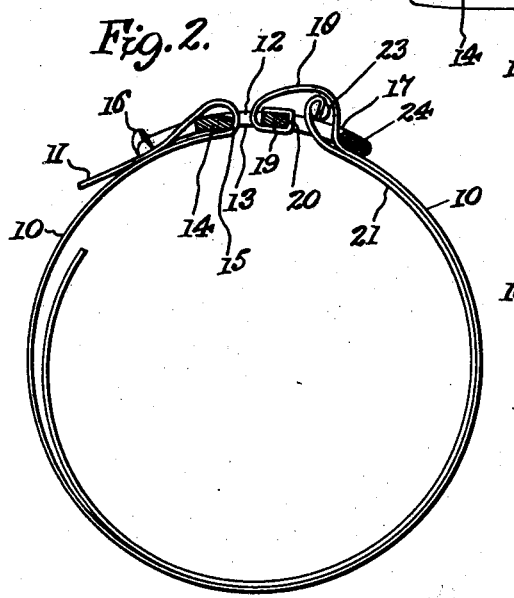
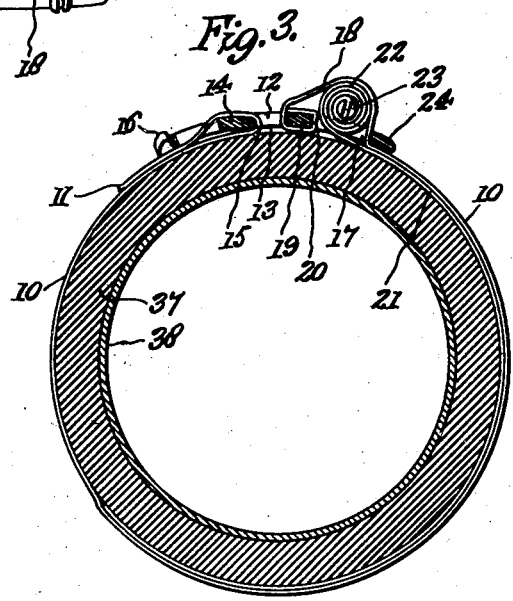
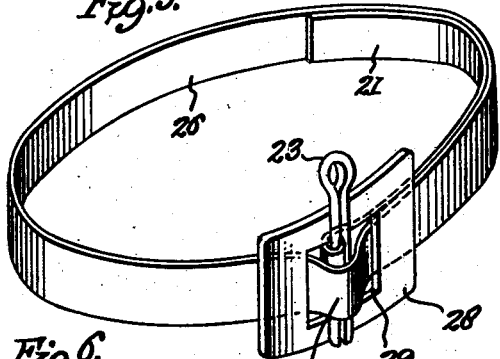
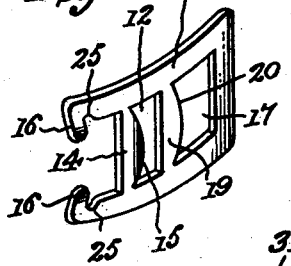
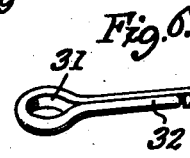
Inventor
Albert J. Scholtes
By Mawhinney & Mawhinney
Attorneys Patented June 25, 1935

2,006,327

UNITED STATES PATENT OFFICE 2,006,327

HOSE CLAMP

Albert J. Scholtes, Baltimore, Md.

Application June 29, 1934, Serial No. 733,112

16 Claims. (Cl. 24—19)

The present invention relates to a clamp adapted for use on hose, pipes, and other objects or group of objects adapted to be tightened or bound together with a clamp.

An object of the present invention is to provide a clamp which does not project outwardly to a very great extent beyond the band and which is constructed to be operated in relatively close and inaccessible places, and to provide a hose clamp which may be adjusted into tightened position and which cannot be released except upon breakage of the parts to insure the use of a new band in replacing the hose, pipe, or the like, and thus insuring proper clamping or securing action.

Another object of the present invention is to provide a hose clamp which is of relatively simple and inexpensive construction, and wherein the encircling band is looped at one side into a small loop and means is provided wholly within the loop for expanding the same, and thus reducing the effective binding length of the band.

The invention further provides an improved hose clamp which maintains a portion of an encircling band in loop form and utilizes a strip, or the like, with a simple and effective means for winding the strip upon itself to expand the wound strip within the loop, so that the loop may be enlarged as desired for drawing the band taut, and wherein the winding device may be of any suitable or desired shape, configuration or construction, and may be removably connected to the binding strip or otherwise as found expedient and desirable in the manufacture and use of the clamp.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a fragmentary perspective view of a hose clamp constructed according to the present invention, parts of the band and winding strips being broken away.

Figure 2 is an edge view of the hose clamp embodying the improvements of this invention.

Figure 3 is a similar view but with the clamp in tightened position upon a hose.

Figure 4 is a detail perspective view of the buckle or looping plate.

Figure 5 is a perspective view of a slightly modified form of the clamp.

Figure 6 is a detail perspective view of a modified form of the winding member, and Figure 7 is a similar view of another modified form of the winding member.

Referring now to the drawing, and first to Figures 1 to 4 inclusive, 10 designates an encircling band which may be of any suitable material and length, but which in the present instance is shown as of strap form, and may be a strip of metal of sufficient length to encircle the pipe or other object to be clamped and with sufficient length to carry out the features of the invention.

One end 11 of the band or strip 10 is threaded outwardly through an opening 12 formed transversely in a loop forming or buckle plate 13, and is overturned through the opening or slot 12 about a cross bar 14 and bent backwardly upon the body portion of the band 10, as shown in Figure 2 particularly. The cross bar 14 is provided preferably, as shown to advantage in in Figure 4, with a convex edge 15 adapted to engage the inner side of the overturned end 11 of the band so as to bulge or distort the overturned portion of the band in such manner so as to insure the binding of the band on the cross bar 14 to hold the band 10 from pulling away from the buckle plate 13. The buckle plate 13 is provided with a pair of inwardly extending fingers 16 which are spaced from the cross bar 14 and which are adapted to over-lie the outer face of the end 11 of the band, the fingers 16 being slightly inclined outwardly from the band 10 to facilitate the introduction of the free end 11 into and out of engagement with the under sides of the fingers by a slight edgewise sliding or buckling movement of the free end 11.

The other end of the band or strap 10 is looped upwardly through a second opening 17 provided in the opposite end portion of the buckle or loop forming member 13, the portion of the band 10 which extends through the opening 17 providing a small loop 18, and the material of the band extends from the loop 18 back through the opening 12 of the buckle and is rolled about an intermediate cross bar 19 which separates the openings or slots 12 and 17 in the buckle 13. This bar 19 is also provided with a convex edge 20 similar to the edge 15 of the cross bar 14 and adapted to engage the end portion of the loop 18 to anchor the same to the bar 19.

The band 10 is tightened or contracted by enlarging the small loop 18, and this may be done in various ways. In the present instance, the expanding means is disposed wholly within the loop 18 so as not to project beyond the same and thus provide a clamp which occupies but relatively small space.

The means for expanding the small loop 18 comprises a winding strip 21 which may be of any suitable length and preferably disposed against the inner side of the band 10.

One end of the winding strip 21 is passed outwardly through the opening 17 in the buckle plate 13 and is rolled upon itself within the loop 18 into successive layers, building up an expanding roll, such as shown at 22 in Figure 3. This expanding roll 22 enlarges the loop 18 by engaging the inner face thereof and as the end of the loop 18 is anchored to the cross bar 19, the enlargement of the loop must necessarily draw the adjacent end of the band 10 outwardly through the opening 17 of the buckle plate and consequently contracts the effective portion of the band or clamp. The winding strip 21 may be rolled upon itself in any suitable manner, and in Figures, 1, 2 and 3, a cotter pin 23 is shown for this purpose. The split end of the cotter pin 23 is engaged over the end portion of the strip 21 and the eye of the cotter pin may be used for turning the pin to wind the strip 21 about the shank of the cotter pin. Any suitable implement may be inserted through the eye of the cotter pin to accomplish this purpose or any suitable clamping means or a wrench or the like may be engaged with the cotter pin so as to secure the strip in a compact roll 22. The band 10 is preferably constructed of metal, as also is the winding strip 21, and the winding strip is sufficiently pliable to be rolled or bent into roll form and to maintain its rolled form or shape as shown in Figure 3.

It will be noted that as the expanding roll is formed by the turning of the cotter pin 23, or the like, the side of the roll 22 adjacent the bar 19 binds against the adjacent overturned end of the band 10 to firmly lock it upon the cross bar 19 and thus hold the loop 18 from pulling open. It will be noted that the sliding movement of the strip 21 during the winding action is in the same direction as that of the band 10 as the latter is contracted and drawn through the buckle opening 17. It will be noted that the outer end bar 24 of the buckle plate has a rounded inner edge to freely receive thereover the band 10 as it is drawn to enlarge the loop 18. The fingers 16 are provided at their inner sides with notches or recesses 25 adapted to receive the edge portions of the end 11 of the band when the latter is twisted or slid in an edgewise direction to free the band from the fingers 16. In the modification shown in Figure 5, an endless band 26 is shown adapted to encircle a hose or the like, and one portion of the band 26 is formed into a small loop 27 by a loop or buckle plate 28 provided with a single opening 29 therethrough. The small loop 27 is formed by merely looping a portion of the band 26 outwardly through the opening 29. The small loop 27 is enlarged for contracting the band 26 by the winding strip 21 and winding member 23, such as shown in the above described form.

While various forms, shapes, and constructions of turning members 23 may be used, Figure 6 shows a double cotter key 30 having heads or eyes 31 on opposite ends and a split shank 32 joining the heads 31. The shank 32 is adapted to receive therein the free end of the winding strip 21, so that the winding member may be turned from either end.

In Figure 7, a further modification of winding member is shown wherein a shank is adapted for engagement in the roll 22 and has a transverse slot 34 for the free end of the winding strip 21. The shank 33 carries rectangular or other suitably shaped heads 35 on opposite ends, and the heads 35 are provided with radial openings 36 suitably placed about in the peripheral portion of the heads 35 to receive a turning pin or other suitable implement to wind the strip 21.

It is readily seen that the winding member may be readily detached from the expanding roll 22 where the winding member is free at one end, such as shown in Figures 1 and 5, or the winding member may be constructed to remain as a portion of the clamp when it is of such construction as shown in Figures 6 and 7. Of course, suitable forms may be used.

When the clamp is adjusted to the hose, as shown in Figure 3, or to any other article or articles adapted to be bound together, the turning member 23 is rotated to wind the strip 21 within the loop 18, so that the roll 22 of the strip gradually expands against the inner side of the loop 18 and enlarges the loop. In enlarging the loop 18, the adjacent end of the band 10 is drawn outwardly through the looping member or buckle 13, and the band is thus contracted about the hose, shown at 37, so as to bind the hose upon a pipe 38 or other part to be connected to the hose.

What is claimed is:—

1. A hose and like clamp, comprising an enclosing band, a loop forming member connected to a portion of the band having a small loop therein, a rolling strip projecting at one end into the small loop, and winding means for the rolling strip engaging said end thereof and adapted to be operated to roll the strip upon itself in successive layers and provide an expanding roll within the small loop for enlarging the latter and decreasing the effective length of the enclosing band.

2. A hose and like clamp, comprising a loop forming member, an encircling band having its ends connected to said member and having one end portion looped outwardly through the member, an expansion strip slidably disposed against the inner side of the band with an end passing through said member and confined within the loop of the band, and winding means engaging said end of the band and projecting laterally from the band loop adapted to be operated for winding the strip upon itself in successive layers to enlarge the loop and control the encircling band.

3. A hose clamp comprising a band for encircling a hose or the like, a plate having spaced transverse openings therein providing an end bar and two intermediate bars and having inwardly directed spaced fingers at its end remote from the end bar, one end of said band being overturned beneath said fingers and the adjacent cross bar of the plate with said fingers engaging the outer face of the overturned end of the band, the other end of said band being looped through an opening of the plate adjacent the end bar and with its free end engaged with the adjacent cross bar, a winding strip disposed against the inner side of the band and having an end engaging outwardly into the loop of the band between the end bar and the adjacent cross bar, and a winding device engaging transversely in said loop of the band and with the end of the winding strip for turning the same to wind the strip into an expanding roll within the loop of the band.

4. A hose clamp comprising a band, a plate connected adjacent one end to one end of the band, the other end of the band being looped outwardly through the plate adjacent the other end thereof and being secured at its free end to the plate, a winding strip disposed within the band having one end projecting into the loop of the band, and a transversely disposed winding member projecting into the loop and engaging the end of the winding strip for turning the same into an expanding roll to enlarge the loop and decrease the effective size of the band.

5. A hose clamp comprising an endless band, a loop plate having a central opening through which a portion of the band is looped, a winding strip disposed within the band and having one end engaging through the opening in the plate and into the loop, and a winding device disposed transversely through the loop and engaging the end of said strip to wind the same into an expanding roll for enlarging the loop and reducing the effective size of the band.

6. A hose clamp comprising a band, a plate secured to the opposite ends of the band with one end portion of the band looped outwardly through the plate, a winding strip disposed against the inner side of the band adjacent the looped end thereof with one end of the strip projecting through the plate into the loop of the band, and winding means connected to said end of the strip within the loop for turning the strip to draw the same and the band toward the loop and for winding the end of the strip into an expanding roll to enlarge said loop, said winding strip adapted to frictionally hold the band against pulling out of said loop.

7. A hose clamp comprising a band, a plate secured to the ends of the band and with one end portion of the band looped outwardly through the plate, a winding strip disposed against the inner side of the band with one end engaging through the plate and into the loop, and a cotter pin disposed transversely in the loop with the split shank thereof engaging the end of the strip for winding the strip upon turning of the cotter pin to provide an expanding roll to enlarge the loop.

8. A hose clamp comprising a band, a plate secured to the ends of the band and having a portion of the band looped outwardly through the plate, a winding strip disposed against the inner side of the band with one end extending outwardly through the plate into the loop, and a winding shank disposed transversely through the loop and engaging the end of the winding strip and provided with turning heads on opposite ends for turning the shank and winding the strip into an expanding roll to enlarge said loop.

9. A clamp comprising an encircling band having a loop formed therein, a separate flexible element having one end thereof received in the loop, and feeding means cooperating with the element for forcing the successive portions thereof into the loop to expand the same; thereby contracting the band.

10. A tightener, comprising an encircling band having large and small loops therein, a separate flexible element, and feeding means cooperating with the separate element for introducing the element gradually into the small loop and enlarging the same to reduce the size of the large loop; thereby contracting the same.

11. A hose clamp, comprising an encircling band, a plate secured to the ends of the band and having a portion of the band looped outwardly through the plate, a winding strip projecting at one end into the loop, and a winding shank disposed transversely through the loop and engaging said end of the winding strip and provided with turning heads on opposite ends for turning the shank and winding the strip into an expanding roll to enlarge said loop.

12. A hose clamp, comprising a band, a plate attached to the ends of the band and having an opening therethrough for receiving an outwardly looped portion of the band, a winding strip having one end extending into the looped portion of the band, and a winding device disposed transversely through the loop of the band and engaging said end of the winding strip and adapted to be turned for winding the strip on said device into an expanding roll for enlarging said loop.

13. A tightener comprising an object engaging band having a loop therein, a separate flexible element, and gathering means cooperating with the element for forcing the flexible element into the loop of the band to enlarge the loop and contract the remaining portion of the band; thereby to bind the band in position.

14. A clamp, comprising an object engaging band adapted to be placed about an object to be clamped, an independent flexible element, and gathering means cooperating with the element for spirally winding the element against the band at the side thereof to deform a portion of the band; thereby tightening the other portion of the band about the object.

15. A tightener for an encircling band to bind the same about an object, said band having an initial loop therein, comprising a flexible element, and gathering and forcing means cooperating with the flexible element and the band for feeding and forcing successive portions of the flexible element into said loop to enlarge the same, thereby contracting the body of the band about the object.

16. A band tightener comprising a plate with an opening therethrough, an object encircling band having one end looped through the opening of the plate and secured thereto at the end of the loop, a winding strip portion associated with the band and adapted to enter the loop, and rolling means operable upon said winding strip portion for rolling the same into the loop for expanding the latter; thereby to enlarge the loop and contract the band on the object.

ALBERT J. SCHOLTES.